(12) United States Patent
Mundarath et al.

(10) Patent No.: US 9,100,253 B2
(45) Date of Patent: Aug. 4, 2015

(54) BLOCK-BASED CREST FACTOR REDUCTION

(75) Inventors: Jayakrishnan C. Mundarath, Austin, TX (US); Leo G. Dehner, Austin, TX (US); Jayesh H. Kotecha, Austin, TX (US); Peter Z. Rashev, Calgary (CA)

(73) Assignee: Freescale Semiconductor, Inc., Austin, TX (US)

( * ) Notice: Subject to any disclaimer, the term of this patent is extended or adjusted under 35 U.S.C. 154(b) by 330 days.

(21) Appl. No.: 13/569,148

(22) Filed: Aug. 7, 2012

(65) Prior Publication Data

US 2014/0044215 A1 Feb. 13, 2014

(51) Int. Cl.
*H04L 27/26* (2006.01)

(52) U.S. Cl.
CPC .................................. *H04L 27/2624* (2013.01)

(58) Field of Classification Search
CPC .................. H04L 27/2624; H04L 27/2623
USPC ........................ 375/259–260, 285, 295–296
See application file for complete search history.

(56) References Cited

U.S. PATENT DOCUMENTS

| 6,529,925 | B1* | 3/2003 | Schenk .......................... 708/300 |
| 7,409,009 | B2 | 8/2008 | Akhtman |
| 7,486,738 | B2 | 2/2009 | Trivedi |
| 7,697,591 | B2 | 4/2010 | Copeland |
| 2005/0069045 | A1* | 3/2005 | Laaser ........................... 375/260 |
| 2007/0217527 | A1* | 9/2007 | Rajagopal et al. ............. 375/260 |
| 2010/0244949 | A1* | 9/2010 | Gustavsson et al. ....... 330/124 R |
| 2012/0064848 | A1 | 3/2012 | McGowan et al. |
| 2012/0093210 | A1* | 4/2012 | Schmidt et al. ................ 375/224 |
| 2013/0114761 | A1* | 5/2013 | Azadet et al. ................. 375/296 |
| 2013/0177057 | A1* | 7/2013 | Pavel et al. .................... 375/224 |
| 2014/0072073 | A1* | 3/2014 | Azadet et al. ................. 375/296 |
| 2014/0169496 | A1* | 6/2014 | Yang et al. .................... 375/296 |

* cited by examiner

*Primary Examiner* — Jean B Corrielus
(74) *Attorney, Agent, or Firm* — Terrile, Cannatti, Chambers & Holland, LLP; Michael Rocco Cannatti

(57) ABSTRACT

A method and apparatus for a radio base station (200) generates a multicarrier communication signal having a reduced crest factor by processing a block of samples (231) with a peak search window (271) to identify and suppress signal peaks exceeding a power threshold value.

21 Claims, 7 Drawing Sheets

BLOCK-BASED CREST FACTOR REDUCTION

BACKGROUND OF THE INVENTION

1. Field of the Invention

The present invention is directed in general to field of wireless communication devices. In one aspect, the present invention relates to a signal processing in a wireless communication system, apparatus, and method for enabling efficient operation of power amplifiers by reducing peak to average amplitude ratios of communication signals.

2. Description of the Related Art

Wireless communication devices, such as mobile devices and base stations, typically include transmitter and receiver circuits (i.e., transceivers) in which power amplifiers are used to amplify a signal before wireless transmission to another device. For example, base stations employing wideband digital communication transmitters will constructively add a plurality of carrier signals, resulting in multi-carrier signals with large peak-to-average power ratios (PAPR) which can adversely constrain the performance of high power amplifiers used to amplify the multi-carrier signal for a transmission. Such high power amplifiers can be very expensive and inefficient parts of the base stations, in part, because the power amplifiers are designed according to the maximum peak power that they have to handle. In order to reduce the cost and improve efficiency of the power amplifier, crest factor reduction (CFR) algorithms have been developed to reduce the peak power of the signals that the power amplifier must amplify. Typically, CFR processing is applied in real time to sequentially process input signal samples to detect peaks in the signal envelope above a certain threshold, and then perform subtractive modification of a region surrounding each detected peak to suppress the peaks to below the threshold. Such real-time detection and processing to sequentially suppress peaks one at a time can impose significant complexity and costs in requiring specialized hardware (such as delay units, synchronization circuits, etc.) and/or high sampling rates, and can also be susceptible to known problems, such as peak regrowth, etc.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
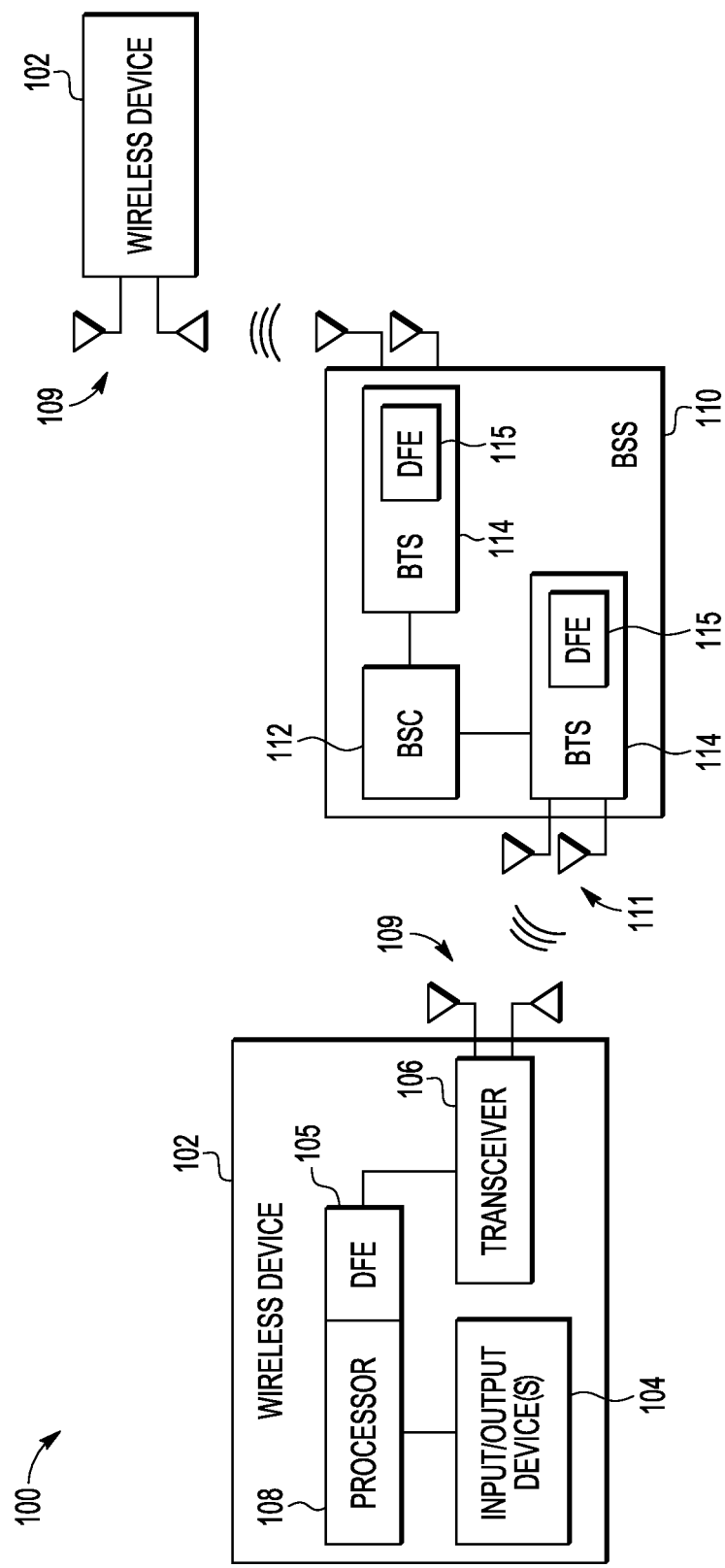
FIG. 1 is a simplified block diagram of a wireless communication system in which a digital front end at a multi-carrier transmitter employs crest factor reduction techniques in accordance with selected embodiments of the present disclosure.

A system, apparatus, and methodology are described for performing crest factor reduction (CFR) with a non-sequential, non-real time process that collects a block of input IQ samples from a composite carrier, detects all peaks in the signal envelope above a threshold within the block, and selectively cancels or suppresses one or more peaks within a cancellation window that includes the block of input IQ samples. In selected embodiments, a single chip digital front end processor at a base station performs crest factor reduction on a composite multi-carrier waveform by using a peak search window to search a collected block of input samples and detect all peaks above a threshold within the peak search window. Selected peaks within a first peak search window may be canceled by applying a cancellation waveform of differential values to input samples within the first peak search window. In cases where the cancellation waveform overlaps with samples in an adjacent peak search window, a larger cancellation window for the first peak search window block is defined to include cross-over samples and differential values with the adjacent peak search window. By storing cross-over samples and differential values from the larger cancellation window which overlaps with samples in adjacent peak search windows, continuity of processing may be achieved. In selected embodiments, an efficient CFR peak detection and cancellation scheme is provided which uses a low rate search and selection process to select one or more peaks from the samples in the peak search window, followed by a localized interpolation and upsampling around the selected peak(s) at a higher rate to select a new, higher accuracy peak which may be used to adjust the phase of the cancellation waveform at the lower sampling rate to effectively achieve the performance of cancellation at the up-sampled rate. In other embodiments, improved CFR peak detection may be achieved by using first level search to identify low rate signal sample regions in the peak search window where the largest true peaks can be found at less than the higher (8×) signal sample rate. In the signal ample regions identified by the first level search, a second level search is performed to apply a low rate peak search process to identify true peaks, followed by a third level search that is performed at a higher sample rate to determine the exact parameters of the true peak. The exact peak parameters may then be used to adjust the value and location of the cancellation signal by re-mapping the true peak's amplitude and phase from the high to the low signal rate. In this way, multiple detected peaks can be processed together in software using vector processors without requiring specialized hardware to achieve better performance.

In this disclosure, an improved wireless telecommunications system, apparatus, and method are described for performing crest factor reduction on multi-carrier transmit signals that address various problems in the art where various limitations and disadvantages of conventional solutions and technologies will become apparent to one of skill in the art after reviewing the remainder of the present application with reference to the drawings and detailed description provided herein. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Turning now to FIG. 1, there is shown a simplified block diagram of a wireless communication system 100 having digital front end (DFE) modules at one or more multi-antenna system nodes for performing crest factor reduction on transmit signals prior to power amplification. The depicted wireless communication system 100 includes a plurality of wireless devices or subscriber stations 102 (e.g., hand-held computers, personal digital assistants (PDAs), cellular telephones, etc.) that wirelessly communicate with one or more base station systems (BSS) 110 (e.g., enhanced Node-B or eNB devices). Each wireless devices 102 may include a processor 108 (e.g., a digital signal processor), a transceiver 106 connected to one or more antennas 109, and one or more input/output devices 104 (e.g., a camera, a keypad, display, etc.), along with other components (not shown). The wireless devices 102 communicate with a base station controller (BSC) 112 of the base station subsystem 110 via one or more antennas 111, 119 and base transceiver stations (BTS) 114 to receive or transmit voice, data, or both voice and data. The BSC 112 may, for example, be configured to schedule communications for the wireless devices 102.

In the embodiments shown, the base transceiver station(s) 114 include a digital front end (DFE) processor 115 which may be implemented as a single integrated circuit to provide the digital components of the cellular base station RF subsystem. The digital components consolidated on the DFE 115 may include one or more control processors and digital transmit/receive filters, as well as interface peripherals and other I/O for RF subsystem functions. In addition and as described more fully below, the DFE 115 may include a transmit processing path for each antenna which performs signal processing on the transmit signal, including block-based crest factor reduction. The CFR-processed transmit signal is then provided to a power amplifier and associated antenna, thereby forming a separate DFE-power amplifier chain for each transmit antenna.

As will be appreciated, the crest factor reduction techniques disclosed herein with reference to the base station system 110 may also be used in connection with a multi-antenna wireless communication device, such as the wireless devices 102. To this end, each wireless device 102 may also include a digital front end (DFE) processor 105 connected to a corresponding transceiver unit 106 which includes a transmit processing path for each antenna which performs signal processing on the transmit signal.

Figure 2:
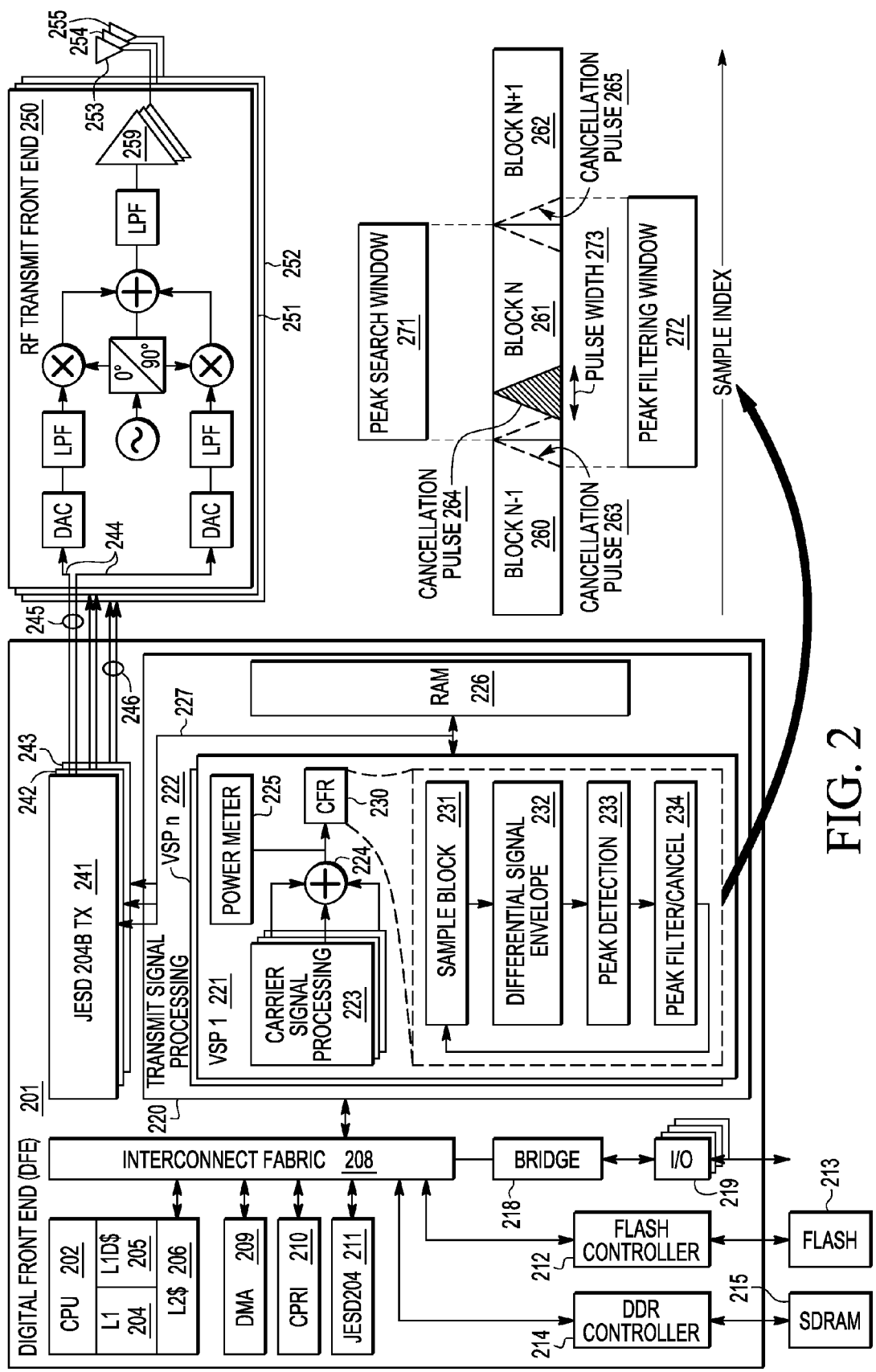
FIG. 2 is a block diagram illustration of a multi-antenna radio frequency (RF) subsystem in which a single chip digital front end (DFE) processor performs block-based crest factor reduction on signals sent to RF transmit front end circuits in accordance with selected embodiments of the present disclosure.

To illustrate the block-based crest factor reduction techniques disclosed herein, reference is now made to FIG. 2 which depicts is a high level architecture block diagram illustration of a multi-antenna radio frequency (RF) subsystem 200 in which a single chip digital front end (DFE) processor 201 performs block-based crest factor reduction on signals sent to RF transmit front end circuits 250-252. The RF base station subsystem 200 is connected between a base station controller (not shown) and transmit antennas 253-255, and includes a single chip digital front end (DFE) processor 201 connected to a plurality of RF transmit or transceiver front end circuits 250-252. As will be appreciated, a radio receiver front end may be understood to refer to all circuitry between the antenna and the first intermediate frequency (IF) stage, including analog and digital receiver components that process the signal at the original incoming radio frequency (RF) before it is converted to an intermediate frequency (IF). In this arrangement, the digital front end (DFE) processor 201 may be located in a radio head that is co-located with the base station controller, or may be located at a remote radio head that is not co-located with the base station controller. For simplicity of illustration, the transmit antennas 253-255 are shown as being connected to the respective transmit front end circuits 250-252, but it will be appreciated that the transmit antennas 253-255 may be shared for both signal transmission and reception in a shared or switched circuit arrangement.

Connected to each transmit antenna (e.g., 253) is an RF transmit front end circuit (e.g., 250) which includes RF conversion circuit components (e.g., digital-to-analog converters, low pass filters, oscillators, splitters, mixers, amplifiers, etc.) for converting and filtering the digital I and Q samples 244 output by the DFE processor 201 to a combined analog signal that is filtered and amplified (e.g., with power amplifiers 259) (e.g., with one or more RF power amplifiers 259) for transmission by a corresponding antenna (e.g., 253). In similar fashion, each receive antenna may be connected to an RF receive front end circuit (not shown) which includes RF conversion circuit components (e.g., bandpass filters, splitters, low pass filters, oscillators, mixers, amplifiers, analog-to-digital converters, etc.) that process the signal from the antenna received at the original incoming radio frequency (RF) and convert it for processing by the DFE processor 201. Though the RF front end circuits (e.g., 250) employ the depicted RF conversion and power amplifier circuit components, it will be appreciated that other RF conversion circuit arrangements and power amplifier components can be used.

The depicted digital front end (DFE) processor 201 is provided to perform digital signal processing for the RF base station subsystem 200 across the separate transmit antennas 253-255. To this end, the DFE processor 201 partitions transmit signals to the antennas into transmit processing paths, and communicates with the baseband modem through the Common Public Radio Interface (CPRI) interface 210 and/or JESD204A/B interface 211. The DFE processor 201 may include one or more control processors 202 (e.g., one or more ARM processor cores), memory subsystems (e.g., L1 instruction cache 204, L1 data cache 205, L2 cache 206), memory controllers (e.g., DMA controller 209, flash controller 212, and DDR controller 214) for interfacing with external memory (e.g., Flash memory 213, SDRAM 215), one or more modem interfaces (e.g., CPRI interface 210 and JESD204A/B interface 211), and I/O facilities (e.g., host bridge 218) for I/O devices 219. As a general matter, any of a variety of memory designs and hierarchies may be employed in, or in conjunction with, with the DFE processor 201. Also, it will be appreciated that the I/O devices 219 may include any desired I/O device, such as Ethernet, I2C, SPI, GPIO, and/or UART devices. All processor subsystems are linked by a multi-level interconnect fabric 208.

To digitally process transmit signals, the DFE processor 201 may also include a programmable transmit signal processing path for each transmit antenna 253-255 which is formed with a transmit signal processor 220 and an associated serialized interface 241-243 (e.g., a JESD204B TX interface) and RF transmit front end 250-252. The transmit signal processor 220 may include one or more processors 221-222 (e.g., vector signal processors VSP1 and VSPn) and associated memory 226 (e.g., RAM) for performing carrier-related signal processing and antenna-specific processing on IQ samples received from the baseband modem. Signal processing along each transmit signal path may be divided between the processors 221-222 and shared memory 226. For example, a first vector signal processor 221 (VSP 1) may be used to scale, filter, interpolate, up-sample, and combine multiple carriers for CFR processing. The composite carrier is then queued for crest factor reduction at the CFR module 230 which generates and stores output IQ samples in a local buffer as described hereinbelow. After the crest factor reduction, the buffer is scheduled for transfer by the DMA to the shared RAM 226. At this point, a second vector signal processor 222 (VSP n) may be used to perform dynamic pre-distortion, interpolation, and/or other signal processing on the output IQ samples retrieved from shared memory 226. Once signal processing is completed, the transmit signal processor 220 may send the processed samples over a signal/buss line 227 to an associated serialized interface (e.g., JESD204B TX 241) for transfer to the transceiver (e.g., 250) over IQ signal lines 244. In this way, a first antenna path is formed by the connection of the transmit signal processor 220 and JESD204B TX interface 241 which are connected over IQ signal lines 244 to transceiver 250 and antenna 253, a second antenna path is formed by the connection of the transmit signal processor 220 and JESD204B TX interface 242 which are connected over IQ signal lines 245 to transceiver 251 and antenna 254, and a third antenna path is formed by the connection of the transmit signal processor 220 and JESD204B TX interface 243 which are connected over IQ signal lines 246 to transceiver 252 and antenna 255.

With each transmit signal path between the DFE processor 201 and antennas 253-255, the output signal (e.g., 244) provided to the RF transmit front end (e.g., 250) is amplified by RF power amplifier circuitry (e.g., 259). As the amplitude of an input signal of an amplifier is increased, the output signal will begin to saturate at some level in the RF amplifier. To maintain linear operation and prevent or reduce saturation, crest factor reduction (CFR) algorithms are used to mitigate the effect of high peak to average power ratio (PAPR) in the transmit signal stream by performing real-time, sequential processing of input signal samples to detect peaks in the signal envelope above a certain threshold (usually based on the RMS value of the signal). As peaks are detected in real time, a region surrounding the peak is subtractively modified to suppress the peaks to below the threshold. However, there are significant processing complexity and cost associated with implementing CFR algorithms with real-time and sequentially processing of input signal samples one at a time.

To efficiently generate a multicarrier communication signal with improved PAPR performance, a crest factor reduction (CFR) module 230 is included in the DFE processor 201 to provide non-sequential, non-real time block-based CFR processing that collects a block of input samples, detects all peaks above a threshold within the sample block, and then filters or cancels a subset (or all) of the detected peaks in the sample block by applying one or more cancellation waveforms or pulses before the sample block is released to the next processing stage. In selected base station embodiments, each transmit signal processing path processes multiple carriers (e.g., eight 5 MHz LTE carriers) with separate carrier signal processing modules 223. Each carrier signal processing module may include one or more transmission shaping filters which receive unshaped baseband transmission signals and output shaped baseband transmission signals which are then multiplied by a corresponding complex carrier signal in one of a plurality of mixers for combination at the summing unit 224 to form a summed composite waveform signal. A power meter or detector 225 detects power levels of the shaped baseband transmission signals and outputs power level signals for use in peak detection processing by the CFR module 230. At the CFR module 230, block processing steps are performed on a continuous input data stream sample, x(t). As a first block processing step, the sample block 231 collects a predetermined number of IQ samples (e.g., 1024 samples) as a block length worth of samples from the input data stream which may be searched by applying a peak search window 271. In addition, a wider peak filter window 272 defines another block of IQ samples (e.g., 1536 samples) in the sample block 231 to which one or more cancellation pulse waveforms may be applied to suppress signal peaks in the peak search window 271. As will be appreciated, the samples in the wider peak filter window 272 can overlap with the samples in the peak search window 271, but may also include cross-over samples from adjacent sample blocks (e.g., Block N−1 or Block N+1).

In a subsequent block processing step, the samples in the sample block 231 are searched by the signal envelope differential calculation block 232 to detect any peaks within the peak search window 271 having power values that exceed a specified power threshold value. In effect, the signal envelope differential calculation block 232 filters out any sample values below the specified power threshold value to identify only the peaks in the sample block 231 that meet and/or exceed the specified power threshold value. In selected embodiments, the peak search process 232 identifies any input IQ samples in the sample block 231 with batch size B having power values (e.g., $|x(t)|^2$) which exceed or surpass a pre-specified peak power threshold T by calculating, for t=0:B−1 (within the peak search window), $a(t)=|x(t)|^2-T$ (where a(t) is a complex vector) and $b(t)=a(t)+|a(t)|$ (where b(t) is a real vector). The resulting real vector b(t) represents a differential signal envelope in which $b(t)=2*(|x(t)|^2-T)$ if the complex vector a(t)>0, but otherwise b(t)=0.

The differential signal envelope waveform generated from the sample block 231 by the peak search process 232 may be searched by the peak detection block 233 to calculate specific peak index and amplitude values for detected peaks within the peak search window 271. In selected embodiments, the peak detection process 233 processes the differential signal envelope waveform by calculating, for t=0:B−1 (within the peak search window), $d(t)=b(t)-b(t-1)$ (where d(t) is a real vector) and storing the resulting sign (d(t)) in an indexed register which can be searched to find '01' transitions in the register which correspond to local maxima or peak values. The resulting set of local peak indices within batch B may be stored as $p_i=\{t=0:B-1:d(t)>0 \text{ \& } d(t+1)\leq 0\}$.

In a subsequent block processing step, one or more of the peaks in the sample block 231 detected by the peak detection process 233 are processed by the peak filter block 234 to cancel or filter based on predetermined suppression criteria. In selected embodiments, the peak filter block 234 is configured to use predetermined suppression criteria to cancel the largest M peaks in the set of local peak indices, subject to a minimum separation requirement between canceled peaks. This peak filter approach mitigates peak regrowth. In other embodiments, the peak filter block 234 cancels or filters selected peaks by generating a correction or differential waveform that is applied as a cancellation pulse to each selected peak in the peak filtering window 272. As shown in FIG. 2, the cancellation pulses may be applied anywhere with a sample block (e.g., Block N 261) where a selected peak is located, whether at the edge of the block (as shown with cancellation pulses 263, 265) or an intermediate position in the block (as shown with cancellation pulse 264). In addition, the block-based cancellation of all selected peaks in the selected block together may conveniently be implemented in software on a vector processor before the block is released to the next processing stage, in contrast to prior real-time approaches that rely on a "cancellation-on-arrival" model. In selected embodiments, the peak filter process 234 processes the local peak indices from the sample block 231 having batch size B by subtracting a correction or cancellation pulse waveform from each peak in the peak filtering window 272, and storing the resulting output data stream of IQ samples (y(t)). The correction waveform may be generated as a cancellation pulse for each selected peak by applying a scaling factor c to a defined subtraction waveform s(t), where the scaling factor c is function of the difference between the peak and threshold power values. In this way, each input data stream sample (x(t)) stored in peak filtering window 272 may be individually modified or filtered together in a single subtraction filtering operation to effectively reduce or eliminate peak values above the pre-specified peak power threshold T using one or more iterative passes through blocks 231-234. In addition, the cancellation pulse waveform may be padded with zeros to ensure a simple vector engine implementation without having to start canceling from arbitrary offsets within the input signal samples.

As shown in FIG. 2, the peak filtering window 272 is wider than the peak search window 271 because the cancellation pulse (e.g., 263) applied to Block N 261 may overlap with data samples in an adjacent sample block (e.g., Block N−1 260). Similarly, the cancellation pulse 265 applied to Block N 261 may overlap with data samples in the next adjacent sample Block N+1 262. In order to ensure continuity between processing of adjacent sample blocks, cross-over samples and differential values from one block are stored for use in processing an adjacent block. In addition, the distance of the last selected peak from end of a given sample block may be passed to the next sample block to ensure that the first selected peak in the next sample block is no closer than the desired number of samples.

By disclosing a block-based approach for CFR processing whereby multiple peaks captured with a peak search window 231 may be processed at the same time, peaks within a signal region may be selectively cancelled using a convenient software implementation on vector processors without the need for specialized hardware (e.g., delay units, synchronization hardware, etc.) that is needed for real time processing. In addition, processing along the edges of sample block may be managed to preserve continuity of data processing while reducing the complexity of peak-processing within the block.

To further illustrate the block-based crest factor reduction techniques disclosed herein, reference is now made to the simulated waveform signals in FIGS. 3a-d which illustrate operation of block-based CFR processing in accordance with selected embodiments of the present disclosure. Starting with FIG. 3a, there is shown a first simulated real envelope waveform 300 of the power values $|x(t)|^2$ for input IQ data samples sampled at a first relatively low sampling rate (e.g., 1×). As depicted, the waveform 300 shows the power values $|x(t)|^2$ for the input data stream samples over a range of sample index values (1900-1940) in which there is a plurality of localized peaks, including one or more peaks 301-305 within the peak search window 306 which surpass a predetermined peak power threshold $V_{TH}$. Referring back to FIG. 2, the waveform 300 corresponds to the summed composite waveform signal provided as an input to the CFR module 230, and the identification of the peak index and power/amplitude values (including the uppermost peak 304 located at sample index 1923 and having a sample power value of 0.41 watts) may be generated from the samples in the sample block 231 by the signal envelope differential calculation block 232 and/or peak detection block 233.

Figure 3A:
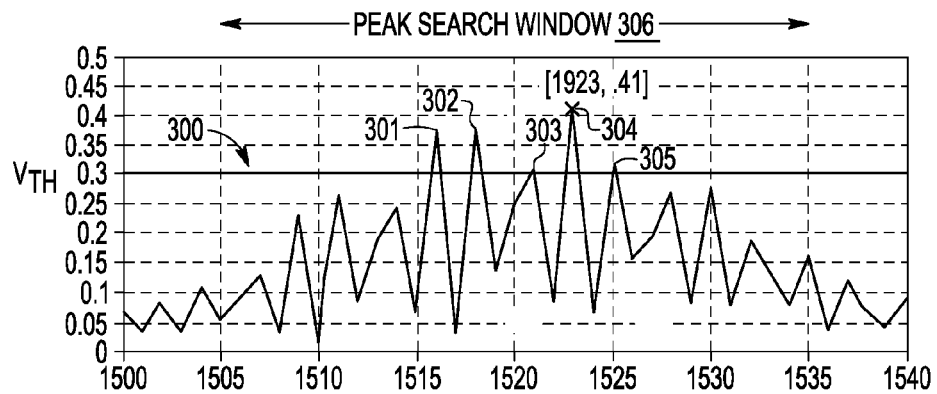
FIGS. 3a-d depict simulated waveform signals to illustrate operation of block-based CFR processing in accordance with selected embodiments of the present disclosure.
Figure 3B:
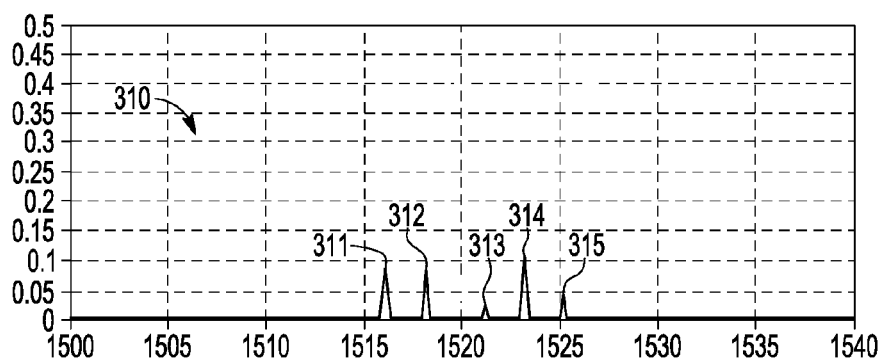

Referring now to FIG. 3b, there is shown a second simulated waveform 310 that is calculated from the block of input IQ data samples 300 contained in the peak search window 306. As depicted, the waveform 310 is the calculated differential signal envelope waveform of all peaks from the input IQ data samples 300 in the peak search window 302 that are above the predetermined peak power threshold $V_{TH}$. As will be appreciated, the peak power threshold $V_{TH}$ may have any specified value (e.g., $V_{TH}$=0.3 Watts) and may be determined using any desired computation, such as the RMS value of the input signal 300. As depicted, the signal envelope waveform 310 includes only the localized peaks 311-315 corresponding in location to the peaks 301-305 which surpass the predetermined peak power threshold $V_{TH}$ from the input signal 300. As such, the differential signal envelope waveform 310 conveys the differential values (between the peak and power threshold values) and the sample index location in the block for each peak 301-305. Referring back to FIG. 2, the differential signal envelope waveform 310 is generated from the samples in the sample block 231 by the signal envelope differential calculation block 232 and/or peak detection block 233.

Figure 3C:
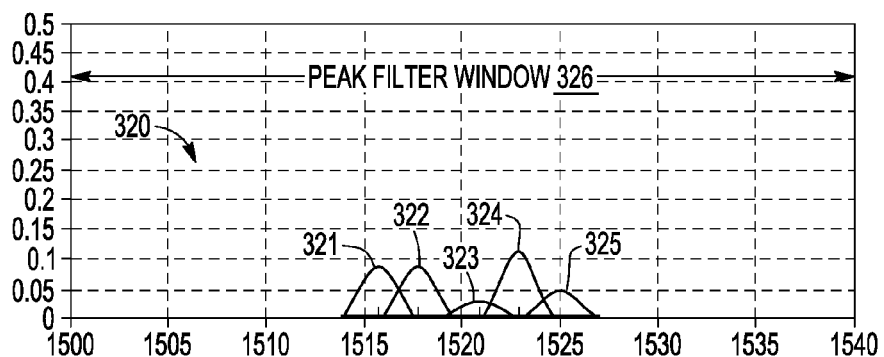

Referring now to FIG. 3c, there is shown a third simulated waveform 320 of cancellation pulse waveforms 321-325 that are generated for Q data samples based on the amplitude and location of the peak(s) 301-305 in the waveform 300. A similar set of cancellation pulse waveforms (not shown) are generated for I data samples based on the amplitude and location of the peak(s) 301-305 in the waveform 300. As illustrated, each cancellation pulse waveform (e.g., 321) is applied as a correction signal waveform to a corresponding peak (e.g., 301) in the peak filter window 326. Referring back to FIG. 2, the correction signal waveforms 321-325 are generated by the peak filter block 234.

Figure 3D:
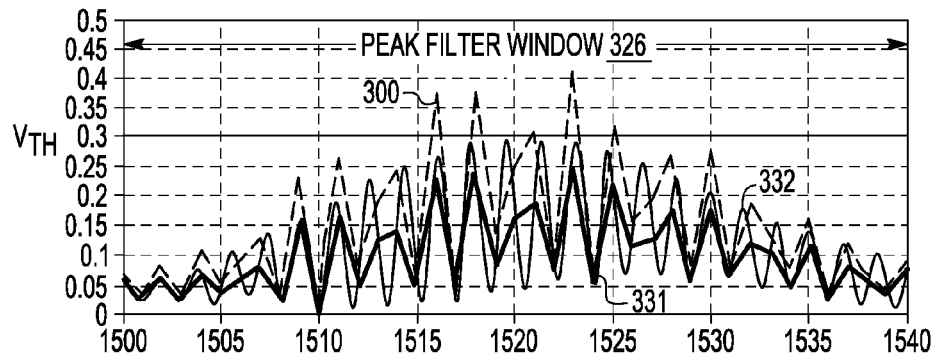

Referring now to FIG. 3d, there is shown a fourth simulated waveform 331 that is generated based on applying the correction signal waveforms (e.g., 321-325) to the input IQ data sample waveform 300 (shown in dashed lines) contained in the peak filter window 306. As depicted, the fourth simulated waveform 331 is $|y(t)|^2$, which is the power envelope of the suppressed output data stream of IQ samples (y(t)) which are generated at the first relatively low sampling rate (e.g., 1×) by subtracting the correction signal waveforms from the input IQ data sample waveform 300. Using one or more passes through the CFR module 230, the output data stream waveform 331 may be generated so that all localized peaks are below the peak power threshold $V_{TH}$. Referring back to FIG. 2, the output data stream waveform 331 is generated by the peak cancel block 234 and may be processed with one or more additional iterations of the processing blocks 231-234 or output by the CFR module 230. For comparison purposes, an 8× upsampled suppressed waveform 332 is also shown to illustrate effective suppression at the upsampled 8× rate.

Even with block-based CFR processing, the need to efficiently and accurately detect peaks remains a challenge from a complexity view-point, particularly with the large number of peaks in the multi-carrier transmit signals. For example, with conventional CFR processing which is applied in real time to sequentially process all input signal samples, each and every peak above a target threshold is used to generate a pulse train sequence which is filtered with a peak pulse shaping filter to create a bandlimited cancellation waveform. The generation of cancellation waveform from every single peak over the target threshold can overwhelm the processing capabilities of the transmitter. In similar fashion, attempts to obtain higher accuracy of peak detection by upsampling all the input data samples to a higher sampling rate prior to peak detection processing can increase processing complexity. The use of block-based CFR processing allows the processing complexity to be reduced by searching the transmit signal in batches in a down-sampled domain for a collection of peaks in a local neighborhood from which a single peak may be selected using an efficient peak detection algorithm. For example, once a collection of peaks in a local neighborhood is identified in a down-sampled domain, improved peak accuracy may be obtained by processing one or more of the collection of peaks in an up-sampled domain to detect the true peak, thereby avoiding sampling all input data samples in the up-sampled domain. In addition, peak cancellation costs can be kept the same by adapting the phase of the cancellation waveform to match the up-sampled peak.

Figure 4:
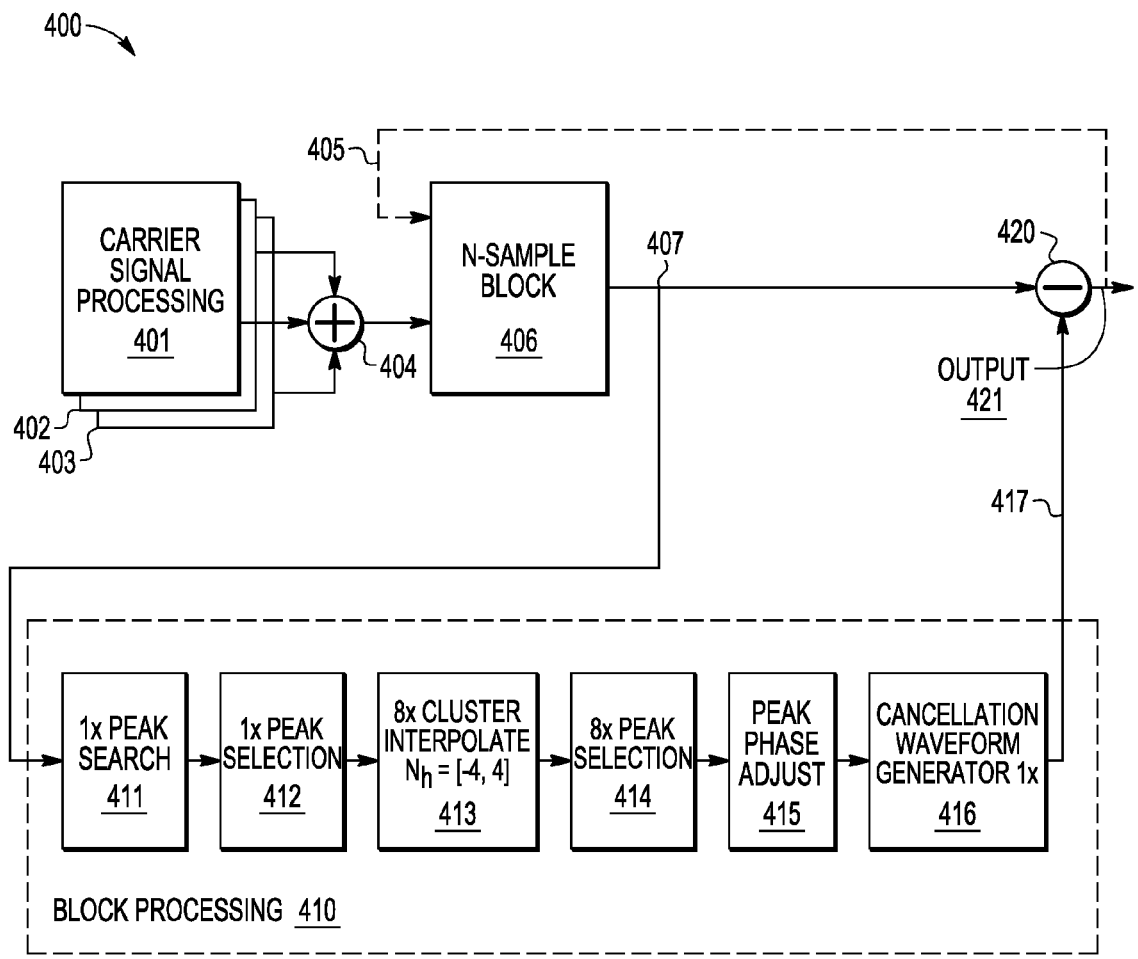
FIG. 4 is a block diagram of the processing steps used to efficiently detect peaks and apply a cancellation waveform with a reduced sampling rate for use in CFR signal processing in accordance with selected embodiments of the present disclosure.

To illustrate selected embodiments for reducing the number of peaks to be cancelled, reference is now made to FIG. 4 which is a block diagram 400 of the processing steps used in a transmit signal processing path to efficiently detect peaks and apply a cancellation waveform with a reduced sampling rate for use in CFR signal processing. As disclosed, the processing steps include a peak selection algorithm which reduces the number of peaks to be cancelled by selecting a single peak from a cluster of peaks selected in a local neighborhood using a lower sampling rate (e.g., 1×). But instead of upsampling all the samples, only samples in a neighborhood around the detected peaks are upsampled at the higher sampling rate (e.g., 8×) to obtain higher accuracy detection of a true peak with reduced complexity. Further complexity reduction is obtained by cancelling at the lower sampling rate (e.g., 1×) by using the true peak values to adjust the phase of the cancellation waveform to effectively achieve the same performance as cancellation at the upsampled rate.

In selected base station embodiments, each transmit signal processing path processes multiple carriers (e.g., eight 5 MHz LTE carriers) with separate carrier signal processing modules 401-403 which generate shaped baseband transmission signals which are then multiplied by a corresponding complex carrier signal for combination at the summing unit 404 to form a summed composite waveform signal which is then processed by the CFR module (e.g., 230) with a plurality of block processing steps 410.

As a preliminary block processing step, the sample block 406 collects a predetermined number of IQ samples from the original composite waveform which may be searched by applying a first peak search window. The composite waveform output 407 from the sample block 406 is then simultaneously applied to the differential summing unit 420 and to the low rate peak search block 411. The low rate peak search block 411 processes the IQ samples 407 from the data block 406 at a first, relatively low sampling rate (e.g., 1× or 122.88 Msps) to identify any peaks in the peak search window that exceed a predetermined peak power threshold (e.g., 0.3). The identified peaks are then processed by a low rate peak selection block 412 which selects one or more peaks from this set for further processing using a predetermined selection algorithm. For example, the peak selection block 412 may keep only a predetermined number of peaks having the highest power (e.g., the top 8 sorted peaks).

For each peak selected by the low rate peak selection block 412, a cluster interpolation block 413 up-samples the low rate samples in a neighborhood around the selected peak to a higher sampling rate. For example, four low rate samples on each side of a detected peak (e.g., [−4, 4]) may be up-sampled to a higher sampling rate (e.g., 8×) in the neighborhood around the detected peak. In selected embodiments, the selective upsampling is performed by the cluster interpolation block 413 which interpolates additional sample values between the low rate samples in the neighborhood of the selected peak. This interpolation processing may be implemented by running a 4×8 poly phase filter on each of the low rate sample values (e.g., 8 low rate samples) in the neighborhood around each a selected peak to generate a new interpolated sample set (e.g., 64 high rate samples). However, it will be appreciated that other types of interpolation filters can be used. For example, an 8-polyphase filter with L taps per phase (e.g., L=4) could be used. Alternatively, interpolation could be implemented using a cascade of three (3) 2× interpolation filters with L1, L2 and L3 taps each stage, where, for example, L1=10, L2=4, L3=4.

From the new interpolated sample set, the high rate peak selection block 414 identifies a true peak (e.g., the interpolated sample with the highest power) and its index is saved for use in generating the cancellation waveform and any phase adjustment thereof. In addition or in the alternative, a predetermined number (e.g., 8) of interpolated samples around the true peak may also be saved. To the extent that the interpolation and true peak selection process is repeated for each predetermined number of peaks selected by peak selection block 412 (e.g., the top 8 sorted peaks), the predetermined number (e.g., 8) of interpolated samples around each true peak may be written adjacent to one another in a vector computation register for storing complex elements (e.g., 64), thereby enabling vector operations to be performed on all peaks at once.

The phase of the new peak may then be used by the peak phase adjustment block 415 to adjust the phase of the cancellation waveform at cancellation waveform generator block 416. In an example implementation, the peak phase adjustment block 415 has access to a plurality of cancellation waveforms (e.g., 8 cancellation waveforms) that correspond to a plurality of different phases (e.g., 8 cancellation waveforms). Using the phase of the true peak, the peak phase adjustment block 415 selects a cancellation waveform corresponding in phase with the true peak.

In addition to adjusting the phase of the cancellation waveform for each selected low rate peak, the peak phase adjustment block 415 may also scale the cancellation waveform by performing vector operations. In selected embodiments, the scaling factor/weights for the cancellation waveform is calculated from the value of the true peak detected among the interpolated samples for each selected low rate peak. The sample index location for each localized peak in the interpolated samples is also calculated. The scaling weights for the entire set may also be calculated using the vector computation register by computing a scaling weight factor, $w(t)=x(t)*(1-\sqrt{T}/|x(t)|)$. Other scaling weight factor algorithms may be used to bring the amplitudes of the interpolated samples below the predetermined power threshold value. Finally, for each set of differential outputs corresponding to a selected low rate peak, the peak phase adjustment block 415 finds a local peak, selects a corresponding weight, and calculates corresponding peak index or location for the local peak.

The selected weight and peak index values for each true peak generated by the peak phase adjustment block 415 are used by the low rate cancellation waveform generator 416 to generate a cancellation waveform 417 at the low sample rate (e.g., 1×). The low rate cancellation waveform 417 is then subtracted from original composite waveform 407 at the differential summing unit 420. By cancelling at the lower sampling rate (e.g., 1×) with a phase adjustment of the cancellation waveform, effectively the same performance is achieved as when cancellation is performed at the upsampled rate, but with reduced complexity. As will be appreciated, one or more additional block-based CFR processing passes may be performed on the output block(s) 421 using feedback line 405 to feeding each output block back to the N-sample block 406 for additional block processing at steps 410-416.

Figure 5A:
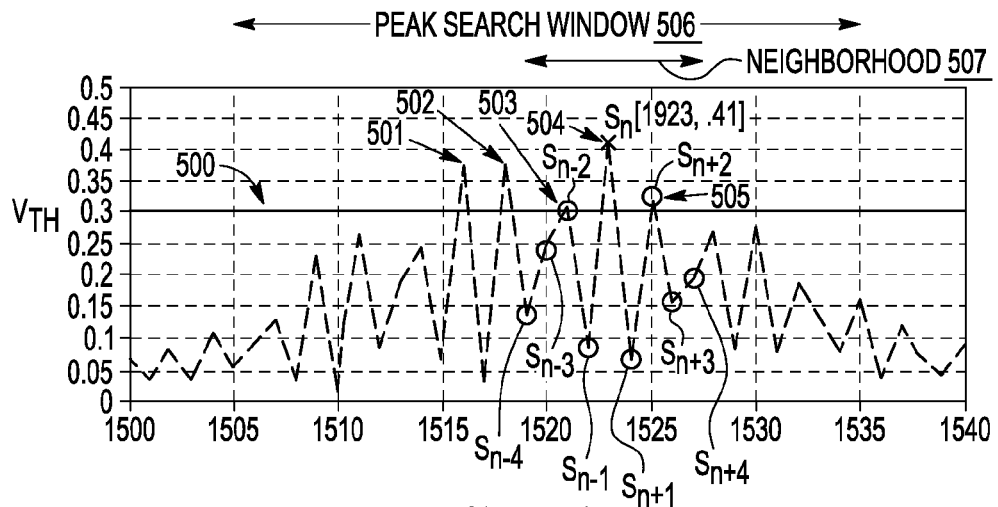
FIGS. 5a-c depict simulated waveform signals to illustrate efficient peak detection for block-based CFR processing in accordance with selected embodiments of the present disclosure.
Figure 5B:
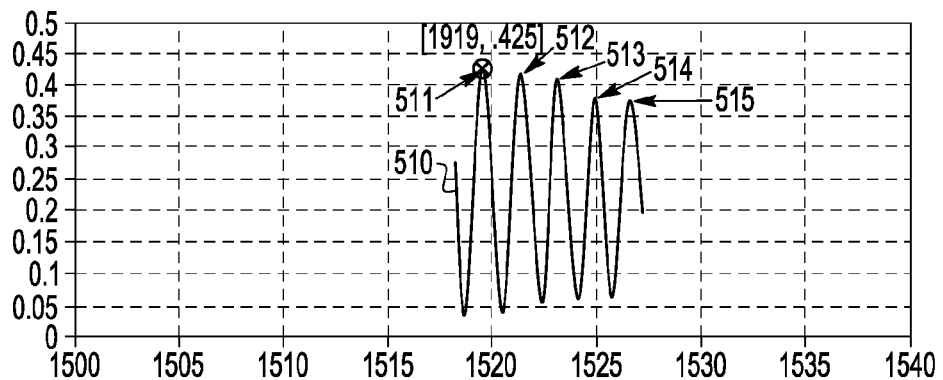
Figure 5C:
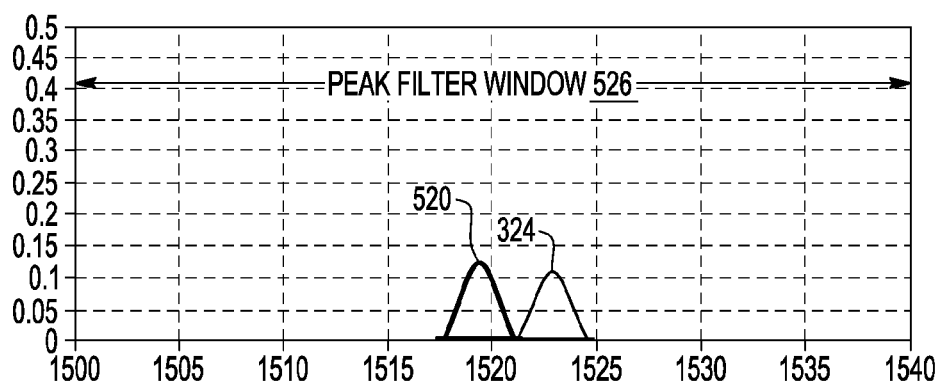

To further illustrate the block-based crest factor reduction techniques disclosed herein, reference is now made to the simulated waveform signals in FIGS. 5a-c which illustrate efficient peak detection for block-based CFR processing. Starting with FIG. 5a, there is shown a first simulated real envelope waveform 500 of the power values $|x(t)|^2$ for input IQ data samples sampled at a first relatively low sampling rate (e.g., 1×). As depicted, the waveform 500 includes a plurality of localized peaks 501-505 within the peak search window 506 which surpass a predetermined peak power threshold $V_{TH}$, including the uppermost peak 504 located at sample index 1923 and having a sample power value of 0.41 watts).

Instead of upsampling all samples in the waveform 500, only samples in a defined neighborhood around a peak sample are upsampled to obtain higher accuracy peak detection. Referring to the uppermost peak 504 as sample Sn, the group of low rate samples in a neighborhood 507 around the peak 504 are identified as Sn−4, Sn−3, Sn−2, Sn−1, Sn+1, Sn+2, Sn+3, and Sn+4. The upsampling may be achieved by interpolating between the group of low rate samples, such as by applying a poly phase filter on the group of low rate samples around the selected peak 504. The resulting upsampled waveform 510 is shown in FIG. 5b. As depicted, the waveform 510 shows the upsampled or interpolated power values $|x(t)|^2$ for the input data stream sample in which there a plurality of localized peaks 511-515, including a new uppermost peak 511 located at sample index 1919 and having a sample power value of 0.425 watts. For comparison purposes, the simulated waveform 500 at the relatively low sampling rate shows a different uppermost peak 504 at sample index 1923 and having a sample power value of 0.41 watts.

As described herein, the sampling index and power amplitude for the new peak 511 (e.g., [1919, 0.425] may be used to calculate local differential values and scaling weights for the cancellation waveform to be applied to the selected peak 504. In similar fashion, these steps may be repeated for other low rate peaks (e.g., 501-503, 505) to derive new peak amplitude and phase information from upsampled or interpolated values, along with corresponding phase adjustment and scaling weight factors.

To illustrate the resulting adjustment of the cancellation waveform, reference is now made to FIG. 5c which shows a third simulated waveform 520 which is the phase-adjusted cancellation pulse waveform generated for Q data samples based on the amplitude and location of the new peak 511 in the waveform 510. A similar set of phase-adjusted cancellation pulse waveforms (not shown) may be generated for other Q data samples, as well as for I data samples. For comparison purposes, the simulated cancellation pulse waveform 324 derived from the relatively low sampling rate samples is also shown. In comparison to the cancellation pulse waveform 324, the phase-adjusted cancellation pulse waveform 520 has its phase and amplitude adjusted based on the relative phase and amplitude of the new peak 511 compared to the original low rate peak 504.

As described herein, the efficiency and accuracy of block-based CFR processing depends on the ability to identify true peaks in the transmit signal that exceed a specified power threshold with reduced complexity and minimized sampling rate. For example, while a collection of down-sampled peaks in a local neighborhood of a sample block may be up-sampled to detect the true peak, the process can require multiple CFR passes on the same sample block. There are also accuracy and efficiency challenges presented in targeting the up-sampling operation to the areas of the transmit signal where the largest true peaks can be found without resorting to up-sampling of the entire signal block at the full ups-sampling rate (e.g., 8×). To further improve the efficiency and targeting of peak detection used in CFR processing, there is disclosed herein a technique for applying a reduced poly-phase interpolation filter to the input sample block prior to CFR processing which reduces the number of CFR iterations applied to the same sample block, thereby improving CFR performance without increasing computational complexity.

Figure 6:
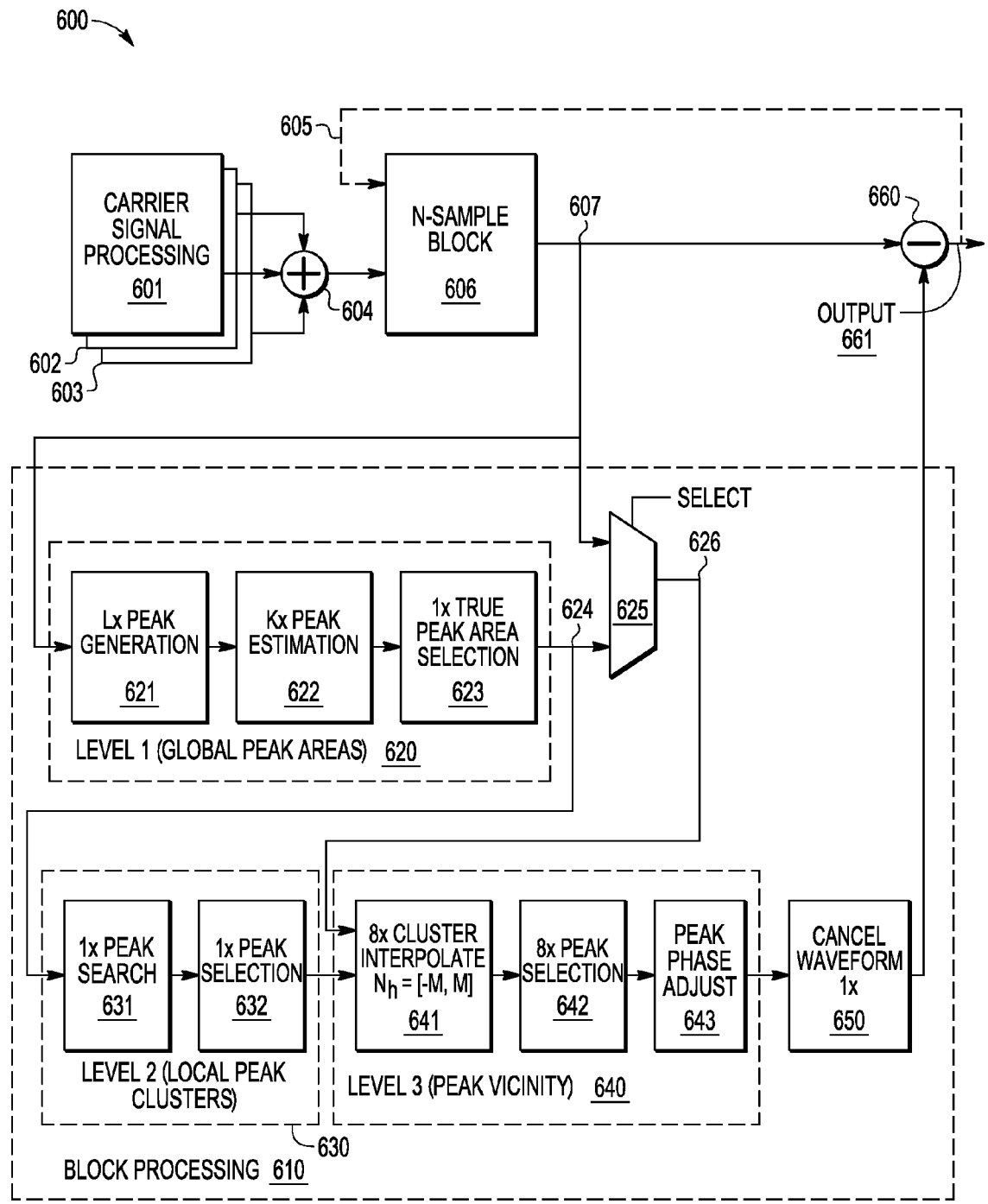
FIG. 6 is a block diagram of the processing steps used to perform multi-level peak identification to identify sparse high-rate signal properties without explicit signal rate conversion and reduced CFR iterations in accordance with selected embodiments of the present disclosure.

To illustrate selected embodiments for efficient peak cancellation, reference is now made to FIG. 6 which depicts a block diagram 600 of the processing steps used to efficiently identify true peaks in a transmit signal. The disclosed processing steps provide a multi-level peak identification strategy to identify sparse high-rate signal properties without explicit signal rate conversion and reduced CFR iterations in accordance with selected embodiments of the present disclosure. With a first high level search (Level 1), a global peak area search is performed to identify areas of the transmit signal where the largest true peaks can be found at less than the higher (8×) signal sample rate. In selected embodiments, the high level search may be implemented with a poly phase filter (e.g., L-phase interpolation filter) which effectively generates L delayed versions of the sample data block, each having the potential to create a new true peaks significant size above a selected threshold, where L corresponds to a relatively higher sample rate (e.g., L≥6). By analyzing the output signal phases from the poly-phase filter, the signal areas containing the largest true peaks may be identified and used by a second level search (Level 2) which operates at a lower sampling rate (e.g., 1×) to find local peak clusters in the signal areas identified by the Level 1 search. Finally, the local peak cluster information is used by a third level search (Level 3) which operates at higher sample rate (e.g., 8× or higher) and over a smaller peak vicinity area of the signal (e.g., 8 interpolated samples around each low rate signal peak) to determine the exact parameters of the true peak. During the search process the transmit signal is not altered until a cancellation signal is applied to it. The value and location of the cancellation signal depend on the true peak in the region and are calculated by re-mapping the peak's amplitude and phase from the high to the low signal rate.

As disclosed and depicted in FIG. 6, each transmit signal processing path processes multiple carriers with separate carrier signal processing modules 601-603 which generate shaped baseband transmission signals which are then multiplied by a corresponding complex carrier signal for combination at the summing unit 604 to form a summed composite waveform signal. At sample block 606, a predetermined number of IQ samples are collected from the original composite waveform which may be searched by applying a first peak search window. The composite waveform output 607 from the sample block 606 is then simultaneously applied to the differential summing unit 660, the selection circuit 625, and the first level search block 620.

In the first level search block 620, the sample block output 607 is searched for global peak areas where the largest true peaks can be found. The global peak search begins with the Lx peak generation block 621 which may be implemented with an L-phase interpolation filter which generates L polyphase versions of the sample data block. In selected embodiments, the number L is selected (e.g., $L \geq 6$) that is higher than the low sampling rate (1×) of the input signal 607. In addition, the L-phase interpolation filter 621 may be implemented with L identical structure branches, each branch running at a low sampling rate 1× signal rate and implementing one of the L poly phase impulse responses of a desired low-pass filter response having an intermediate sampling rate (Lx), thereby providing FIR filtering of the input signal 607. By interpolating the sample block output 607, the Lx peak generation block 621 implements L different phase-shifted versions of the sample block output 607, in effect generating L possible high rate peaks from the input signal 607. However, the Lx peak generation block 621 is limited to calculating a limited subset of K branches/signal phases, where $2 \leq K < L$. In selected embodiments, the value K does not have to be as large as the high accuracy sampling rate (e.g., 8×). In this way, the Lx peak generation block 621 chooses up to K phases of reduced complexity output signals (which may include the original signal) for analysis to find signal areas containing the largest true peak.

At the Kx peak estimation block 622, the chosen subset of K different phase-shifted signal outputs at the low signal sampling rate (1×) from the Lx peak generation block 621 are analyzed to find the signal areas of interest having the largest peak-to-average power ratio (PAPR). In particular, the Kx peak estimation block 622 analyzes K signal blocks or signal areas at the low signal sample rate (1×) by performing one or more signal area calculations, such as average power (rms), peak-power, and/or approximation of the complimentary cumulative distribution function of peak-power levels (CCDF). By analyzing K output vectors from the L-phase interpolation filter 621, the analysis of the K signal phases at the peak estimation block 622 may be implemented as a K dimensional low rate (e.g., 1×) process.

Based on the analysis at the Kx peak estimation block 622, the global peak signal area containing the largest PARP is selected from the K available signal areas by the 1× true peak area selection block 623. The selection of the true peak signal area may be based on one or more predetermined signal parameters, such as the maximum peak-to-average power ratio (PAPR) of each signal area, the slope of CCDF, the sorting of signal areas from largest to smallest PAPR, and/or the sorting of signal areas from smallest to largest average slope of CCDF for power levels above a threshold. In selected first embodiments, the sorted signal areas may be selected by the true peak area selection block 623. In selected embodiments when $K \leq 2$, the true peak area selection block 623 selects the signal phase/signal area having the largest PAPR (or the smallest CCDF slope) as an output 624 to propagate to the next steps (e.g., processing blocks 630, 640) for the current pass of CFR processing. However, in other selected embodiments when $K \geq 3$, the true peak area selection block 623 selects P signal phases/signal areas having the largest PAPR values (or the smallest CCDF slope values) as an output 624 to be used in each of the subsequent passes (one at a time), where $P \leq \text{Round}(K/2)$. With this approach, a different one of the P signal phases/signal areas is used in each of the P succeeding CFR passes (one area per pass). For example, the P=1 signal phase/signal area having the largest PAPR value (or the smallest CCDF slope value) is propagated via output 624 to the next steps (e.g., processing blocks 630, 640) in the first pass, thereby generating a first pass cancellation waveform at the cancellation waveform generator block 650 which is applied to the current sample block at differential summing unit 660 to generate a first pass output that is stored in the sample block 606 via feedback line 605 for the next CFR pass. At this point, the P=2 signal phase/signal area having the next largest PAPR value (or the next smallest CCDF slope value) is selected from the true peak area selection block 623 and propagated via output 624 to the next steps (e.g., processing blocks 630, 640) in the second pass, and so on. In each of the subsequent passes, the sample index or other location information for the selected P signal phase/signal area is provided as input to the second level search block.

As described hereinabove, one or more selected global peak signal areas are output at 624 for connection to both the selection circuit 625 and second level search block 630. At this point, the true peaks in the selected signal area(s) may be reconstructed using high rate (e.g., Mx) interpolation over a reduced sample region of up to 2M samples, where $M \geq L$ and more preferably $M \geq 8$. True peak identification can be performed with a variety of techniques for selectively using a combination of a low sampling rate (1×) cluster search, and a high sampling rate (e.g., Mx sampling, where $M \geq 8$) peak vicinity search.

In an example embodiment for performing a cluster search, a second level search block 630 uses a low signal sample rate (1×) process to select local peak clusters in selected signal areas 624 identified by the first level search block 620 which are not aligned with the input signal block output 607. To this end, the second level search block 630 processes the IQ samples from the selected signal area at output line 624 with the low rate peak search block 631 at a first, relatively low sampling rate (e.g., 1× or 122.88 Msps) to identify any peaks in the peak search window that exceed a predetermined peak power threshold. The identified peaks are then processed by a low rate peak selection block 632 which selects one or more local peak clusters from this set for further processing, such as by selecting only a predetermined number of peaks having the highest power (e.g., the top 8 sorted peaks).

In another example embodiment for performing a cluster search, the second level search block 630 may use brute force sorting to search local peaks within the selected signal area which have been identified using the first level search block 620. The brute force sorting technique starts with a first pass to sort or order local peaks in the signal block by size. Subsequently, a second pass is performed to select the N largest local peaks that are spaced apart from one another by a minimum specified peak separation distance. In selected embodiments, the minimum specified peak separation distance is specified as a function of the peak rank (e.g., the sorted order position).

In yet another example embodiment for performing a cluster search, the second level search block 630 may use divide-and-conquer searching to search local peaks. The divide-andconquer search technique does not use a signal sorting pass to sort or order local peaks in the signal block by size, but instead works on smaller regions of the signal block at each iteration to find the largest peak in a block. Once it is located, the search process moves M peaks to the left and to the right of the largest peak to find largest 2M+1 peaks. The search process may be extended laterally within the signal block until the limit of chosen peaks N is reached or there are no more peaks. In selected embodiments, the limit M may be defined as a function of the CFR iteration or pass number.

In still yet another example embodiment for performing a cluster search, the second level search block 630 may use a peak envelope analysis to search local peaks within the selected signal area have been identified using the first level search block 620. In the peak envelope analysis, the set of all local peaks in a signal block is treated as a signal of continuous point (e.g., a "local peaks signal") and the index values for the actual locations of the local peaks in the signal block are kept as a second "attribute vector" characterizing the local peaks signal and of same length as it. In addition, the local peaks in the local peaks signal are found. These local peaks correspond to the largest peaks in a cluster (i.e. "cluster peaks") and are the local maximums of the envelope function of the signal block 624. Next, an efficient search of the local peaks is applied to make a selection of the N largest cluster peaks and re-map them to the actual signal block using the corresponding index value from the attribute vector.

However generated, the local peak clusters from the second level search block 630 may be provided to the third level search (Level 3) block 640 which processes selected peak vicinity information from the low rate peak selection block 632 at a higher sampling rate to identify true peak information. Whether performed on selected 1× peaks in the selected signal areas (from the first level search block 620) or on selected 1× peak indices in the input signal 607 (routed through selection circuit 625 to bypass first level search block 620), the third level search (Level 3) block 640 provides accurate interpolation of the received signal by a multiple M≥8 of the 1× signal rate in the vicinity of the selected peaks, but not on the entire signal block presented at the input to the third level search (Level 3) block 640. To this end, the third level search (Level 3) block 640 receives a first input from the second level search (Level 2) block 630 which provides information about the location (e.g., sample index) for the true peak, and a second input 626 from the selection circuit 625 which provides the 1× signal block which signal samples which will be subjected to Mx interpolation in order to estimate as accurately as possible the true peak (at Mx rate). The first input of location/index information may be provided to the cluster interpolation block 641 which up-samples the low rate samples from the second input in a neighborhood around the selected peak to a higher sampling rate (e.g., four low rate samples on each side of a detected peak) to a higher sampling rate (e.g., 8×), such as by running a poly phase filter on each of the low rate sample values (e.g., 8 low rate samples) in the neighborhood around each a selected peak to generate a new interpolated sample set (e.g., 64 high rate samples). From the interpolated sample set, the high rate peak selection block 642 identifies a true peak (e.g., the interpolated sample with the highest power) and its index is saved, along with index values for a predetermined number (e.g., 8) of interpolated samples around the true peak.

The interpolated true peak information may be used by the peak phase adjustment block 643 to control the phase and amplitude of the cancellation waveform generated by the cancellation waveform generator block 650. Since the true peaks identified for cancellation by high rate peak selection block 642 will have an arbitrary sub-sample alignment with respect to the stored sample block 606, the peak phase adjustment block 643 can perform phase alignment using any desired phase adjustment technique, such as by performing accurate interpolation by a multiple M≥8 of the 1× signal rate on the original signal at peak locations from the selected areas. Alternatively, the peak phase adjustment block 643 can perform phase alignment by creating the cancellation waveform by selecting the most appropriate phase of the input signal corresponding to one of the poly phases readily available in 641, and hence not implementing additional sub-sample alignment. In either case, the peak phase adjustment block 643 provides phase adjustment information to time-align the cancellation waveform generated by the cancellation waveform generator block 650 with the sample block output 607 that is input to the differential summing unit 660.

At the cancellation waveform generator block 650, the chosen cancellation waveform is scaled by the true peak complex-number value of the true peak output from the third level search (Level 3) block 640.

Advantages of the present invention thus include enabling a reduction in the crest factor of signals transmitted from high power amplifiers, which in turn enables more efficient amplifier design and operation. In accordance with selected multi-level peak identification embodiments, sparse high-rate signal properties are identified without explicit signal rate conversion (in an absolute and poly phase sense), and true peaks are identified with a minimum number of iterations. For example, data simulations have shown benefits of multi-level peak identification in terms of net PAPR reduction gain. For example, application of the third level search (Level 3) block 640 to calculate the true peak provides a net PAPR reduction benefit of approximately 0.2-0.4 dB, while addition of the first level search (Level 1) block 620 to select the true peak area provides a net PAPR reduction benefit of approximately 0.4-0.5 dB, for an overall net PAPR reduction benefit of approximately 0.6-0.9 dB. In addition, selected embodiments provide an efficient peak search which reduces the number of CFR iterations or passes repeated on the same signal block to provide better performance for the same or reduced computational complexity. As a result of the increased efficiencies in peak search and cancellation, 3-pass CFR processing can meet 4G multi-carrier PAPR and Error Vector Magnitude (EVM) targets.

Figure 7:
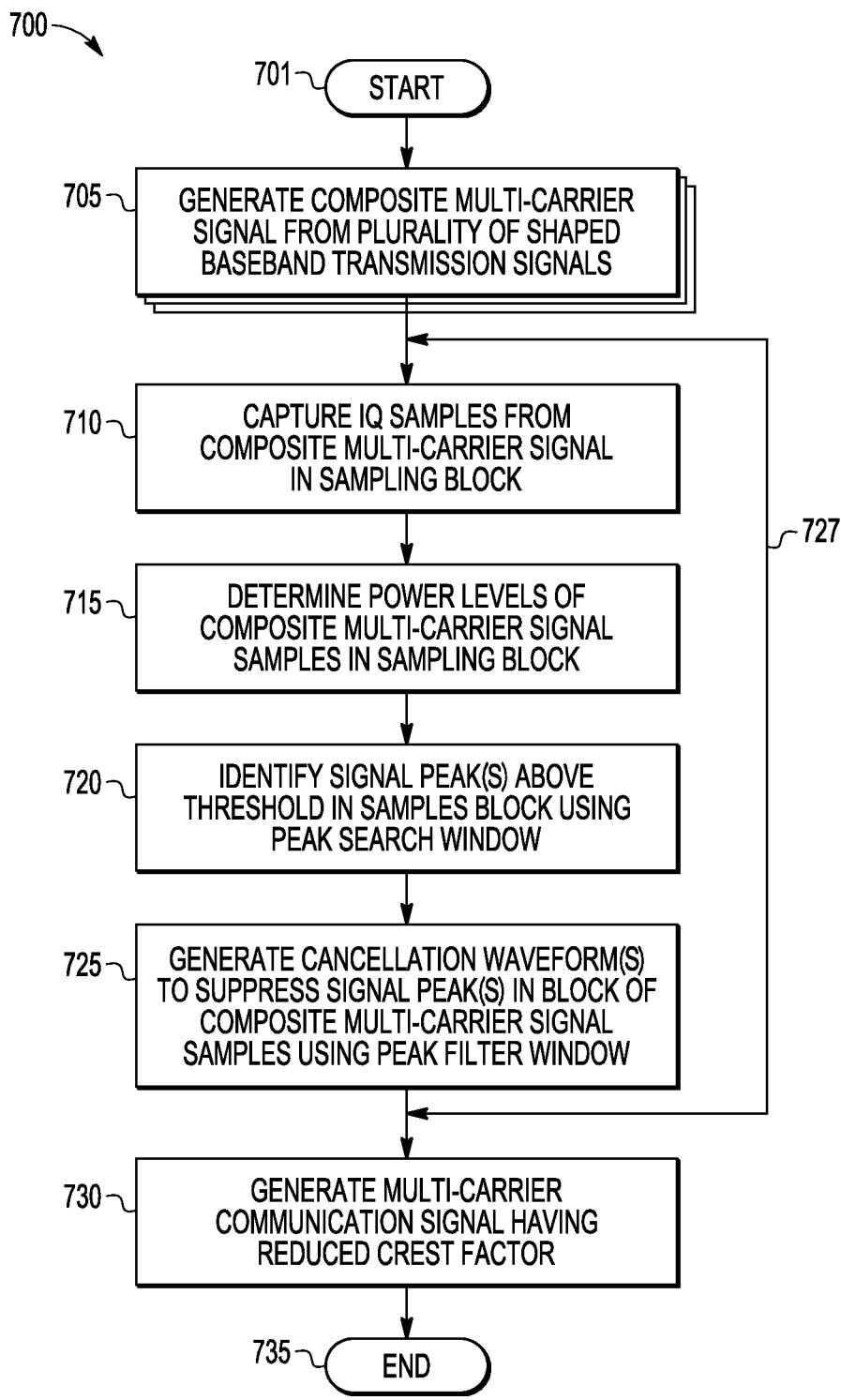
FIG. 7 depicts an example flow diagram of a method for generating a multicarrier communication signal using block-based CFR processing in accordance with selected embodiments of the present disclosure.

Referring now to FIG. 7, there is depicted an example flow diagram 700 of a method for generating a multicarrier communication signal using block-based CFR processing in accordance with selected embodiments of the present disclosure. Once the method starts at step 701, a composite multi-carrier signal is generated from a plurality of shaped baseband transmission signals at step 705. For example, transmission shaping filters may receive unshaped baseband transmission signals and output shaped baseband transmission signals, each of which is multiplied by one of a plurality of complex carrier signals.

At step 710, a block of input samples from the composite multi-carrier signal is collected or captured in a sampling block. For example, a continuous input data stream sample, x(t), may be processed to collect a block of IQ samples for use in subsequent CFR processing.

At step 715, power levels of the composite multi-carrier signal samples in the sampling block are determined. For example, a power detector 225 may be deployed to measure the low rate samples in the sampling block. Alternatively, the power level determination may be made only for the samples within a peak search window.

At step 720, any signal peaks above a specified power threshold in the sampling block are identified using a peak search window to perform non-sequential, non-real time block processing. In selected embodiments, the signal peaks are identified by processing low rate samples to derive the amplitude and location (e.g., sample index) of each peak in the sampling blocks. In other embodiments, signal peaks are identified by first performing a global peak search to identify areas of the transmit signal where the largest true peaks can be found with a relatively low signal sampling rate (e.g., Kx, where K≤8). This information may be used by a peak vicinity search which operates at a higher signal sampling rate (e.g., M, where for M=8 resulting in 8× rate interpolation) over a small signal area (e.g., at least M samples, where for M=8 results in an area of 8 samples) identified with a relatively low rate peak detection process (e.g., 1×) to determine the exact parameters of the true peak. Alternatively, the global peak search may be omitted and the sampling block may be processed with the peak vicinity search process. During the search process, the transmit signal is not altered until a cancellation signal is applied to it. The value and location of this signal depend on the true peak in the region and are calculated by re-mapping the peak's amplitude and phase from the high to the low signal rate.

At step 725, cancellation waveform pulse signals are generated to suppress selected signal peaks in the sampling block. Each selected signal peak may have a corresponding cancellation waveform pulse signal which is phase-adjusted and scaled by a corresponding scaling weight factor so as to suppress the signal peak below the specified power threshold.

Once the phase alignment and amplitude of the cancellation waveform pulse signals are finalized, they are applied to the samples in the sampling block to suppress or cancel the selected signal peaks before the block is released to the next processing stage at step 730, thereby generating a multicarrier communication signal having the reduced crest factor. With reference FIG. 4, a sampling block for a multi-carrier communication signal having a reduced crest factor is output 421 from the differential summing unit 420. As necessary, additional iterative passes through steps 710-730 may be performed as indicated with feedback step 735 to achieve the desired crest factor reduction, and at step 740, the CFR processing ends.

As will be appreciated, the block-based CFR processing techniques described herein provide a way to efficiently reduce the crest factor of signals transmitted from high power amplifiers, and may be embodied in hardware (e.g., as a controller), in processing circuitry (e.g., a processor or controller) executing software (e.g., including but is not limited to firmware, resident software, microcode, etc.), or in some combination of hardware and software elements. Furthermore, the disclosed CFR processing techniques may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD.

By now it should be appreciated that there has been provided an apparatus, method and system for generating a multicarrier communication signal having a reduced crest factor. As disclosed, a sampling block unit stores a block length of input samples collected from a multicarrier communication signal, where each stored sample has a corresponding sample index for locating said sample in the sampling block unit. A crest factor reduction unit coupled to the sampling block memory performs block-based processing to detect one or more signal peaks in the block of input samples which exceed a specified power threshold, and to cancel at least a first selected signal peak selected from the one or more signal peaks by applying a first cancellation pulse to the block of input samples stored in the sampling block memory which is phase-aligned with the selected signal peak. In selected embodiments, the crest factor reduction unit may be configured to perform non-sequential, block-based processing using one or more iterative passes on the block of input samples stored in the sampling block memory in a way that real-time transmission continuity of the multicarrier communication signals is not impacted. In operation, the CFR unit may be configured to use a peak search window when searching the block of input samples to detect one or more signal peaks by calculating a differential signal envelope from the block of input samples stored in the sampling block memory which exceed the specified power threshold. The CFR unit may also be configured to use one or more predetermined cancellation criteria when cancelling at least the first selected largest signal peak to implement a minimum separation requirement between adjacent cancelled peaks by sequentially repeating application of the one or more predetermined cancellation criteria to select a plurality of cancelled peaks within the block of input signals. For example, one of the predetermined cancellation criteria may be that a minimum separate distance exists between any cancelled signal peak, where the canceled peaks are associated with the largest peak power levels within the processed block of input signals after further processing such as rate interpolation and/or digital to analog conversion. In selected embodiments, the CFR unit is configured to simultaneously cancel a plurality of selected signal peaks selected from the one or more signal peaks by applying a corresponding plurality of cancellation pulses to the block of input samples stored in the sampling block memory which are phase-aligned with the plurality of selected signal peaks. To ensure continuity of processing between the blocks of input samples, a memory device stores cross-over samples and differential values from adjacent blocks of input samples. In addition, the CFR unit may be configured to perform block-based processing by using a peak search window to select a first low rate signal peak that exceeds the specified power threshold in the block of input samples, up-sampling a plurality of low rate input samples in a defined neighborhood around the first low rate signal peak to generate a plurality of up-sampled values, and identifying a true signal peak from the plurality of up-sampled values, where the true signal peak has a specified phase and amplitude. In this way, the CFR unit is configured to cancel at least the first selected signal peak by using the specified phase of the true signal peak to adjust the phase of the first cancellation pulse. In selected multi-level search embodiments, the CFR unit a global peak search unit, a true peak search unit, and a cancellation waveform generator unit. The global peak search unit is coupled to the sampling block memory for identifying K signal areas of the multicarrier communication signal where one or more true signal peaks in the block of input samples stored in the sampling block memory can be found at an intermediate signal sampling rate L. In selected embodiments, the global peak search unit includes an L-phase interpolation filter for generating K signal phases from the block of input samples stored in the sampling block memory; a peak estimation unit for analyzing the K signal phases at low signal sampling rate S<L to determine one or more power parameters; and a true peak area selection unit for selecting one or more of the K signal phases for output to the true peak search unit based on the one or more power parameters for each signal phase. The true peak search unit is coupled to the global peak search unit for identifying selected parameters of the one or more true signal peaks in the K signal areas by searching a peak vicinity area of signal area samples at higher signal sampling rate M, where L<M. The cancellation waveform generator unit generates the cancellation pulse for each of the one or more true signal peaks by scaling and time-aligning a cancellation waveform based on the selected parameters of the corresponding true signal peak. Selected embodiments are embodied as an integrated circuit for a wireless communication device which has at least a first radio frequency (RF) signal path connected between the integrated circuit and at least a first antenna, where the integrated circuit includes at least a first vector signal processor for implementing the crest factor reduction unit, and a first internal buffer memory for implementing the sampling block unit.

In another form, there is disclosed a circuit, method, and system for generating a multicarrier communication signal having a reduced crest factor. In the disclosed system and methodology, a first multicarrier communication signal is generated from a plurality of baseband transmission signals, and a block of input samples from the first multicarrier communication signal is stored in a sampling block memory. Subsequently, non-sequential, non-real time block-based processing is performed on the block of input samples stored in the sampling block memory to suppress one or more signal peaks in the block of input samples by generating one or more cancellation pulse waveforms. In selected embodiments, the non-sequential, non-real time block-based processing is performed by detecting one or more signal peaks in the block of input samples which exceed a specified power threshold and separation distance between their sample indices, and then suppressing at least a first selected signal peak selected from the one or more signal peaks by applying a first cancellation pulse to the block of input samples stored in the sampling block memory. In other embodiments, the non-sequential, non-real time block-based processing is performed by detecting a plurality of signal peaks in the block of input samples which exceed a specified power threshold, followed by simultaneously suppressing a plurality of selected signal peaks selected from plurality of signal peaks by applying a corresponding plurality of cancellation pulses to the block of input samples stored in the sampling block memory which are phase-aligned with the plurality of selected signal peaks. In still other embodiments, the non-sequential, non-real time block-based processing is performed using a peak search window to select a first low rate signal peak from the block of input samples that exceeds a specified power threshold. Subsequently, a plurality of low rate input samples are up-sampled in a defined neighborhood around the first low rate signal peak to generate a plurality of up-sampled values, and a true signal peak is then identified from the plurality of up-sampled values, where the true signal peak has a specified phase and amplitude. By applying the one or more cancellation pulse waveforms to the block of input samples stored in the sampling block memory, a second multicarrier communication signal is generated that has a reduced crest factor. As described herein, the steps of performing non-sequential, block-based processing and applying the one or more cancellation pulse waveforms may be iteratively applied with a plurality of passes to the block of input samples stored in the sampling block memory.

Although the described exemplary embodiments disclosed herein are directed to methods and systems for performing CFR processing for transmission signals in a multi-antenna base station controller, the present invention is not necessarily limited to the example embodiments illustrate herein, and various embodiments may be implemented with other devices and circuit components. For example, the disclosed CFR processing method and system may be used with wireless mobile devices, such as wireless handsets. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

What is claimed is:

1. An apparatus for generating a communication signal having a reduced crest factor, comprising:
    a sampling block memory for storing a block of input samples from a multicarrier communication signal; and
    a crest factor reduction block coupled to the sampling block memory for performing block-based processing to detect one or more signal peaks in the block of input samples stored in the sampling block memory which exceed a specified power threshold, and to cancel at least a first selected signal peak selected from the one or more signal peaks by applying a first cancellation pulse to the block of input samples stored in the sampling block memory which is phase-aligned with the selected signal peak, where the crest factor reduction block is configured to use a first predetermined cancellation criterion to implement a minimum separation distance between any cancelled signal peaks.

2. The apparatus of claim 1, where the apparatus comprises an integrated circuit for a wireless communication device comprising at least a first radio frequency (RF) signal path connected between the integrated circuit and at least a first antenna, the integrated circuit comprising at least a first vector signal processor for implementing the crest factor reduction block, and a first internal buffer memory for implementing the sampling block memory.

3. The apparatus of claim 1, where the sampling block memory stores a block length of samples collected from the multicarrier communication signal, where each stored sample has a corresponding sample index for locating said sample in the sampling block memory.

4. The apparatus of claim 1, where the crest factor reduction block is configured to perform non-sequential, block-based processing on the block of input samples stored in the sampling block memory.

5. The apparatus of claim 1, where the crest factor reduction block is configured to perform block-based processing in a plurality of iterative passes on the block of input samples stored in the sampling block memory and in a way that real-time transmission continuity of the multicarrier communication signals is not impacted.

6. The apparatus of claim 1, where the crest factor reduction block is configured to detect one or more signal peaks in the block of input samples by calculating a differential signal envelope from the block of input samples stored in the sampling block memory which exceed the specified power threshold.

7. The apparatus of claim 1, where the crest factor reduction block is configured to use a peak search window when searching the block of input samples stored in the sampling block memory to detect one or more signal peaks.

8. The apparatus of claim 1, where the crest factor reduction block is configured to simultaneously cancel a plurality of selected signal peaks selected from the one or more signal peaks by applying a corresponding plurality of cancellation pulses to the block of input samples stored in the sampling block memory which are phase-aligned with the plurality of selected signal peaks.

9. The apparatus of claim 1, further comprising a memory device coupled to the crest factor reduction block for storing cross-over samples and differential values from adjacent blocks of input samples to ensure continuity of processing between the blocks of input samples.

10. The apparatus of claim 1, where the crest factor reduction block is configured to perform block-based processing by using a peak search window to select a first low rate signal peak that exceeds the specified power threshold in the block of input samples, up-sampling a plurality of low rate input samples in a defined neighborhood around the first low rate signal peak to generate a plurality of up-sampled values, and identifying a true signal peak from the plurality of up-sampled values, where the true signal peak has a specified phase and amplitude.

11. The apparatus of claim 10, where the crest factor reduction block is configured to cancel at least the first selected signal peak by using the specified phase of the true signal peak to adjust the phase of the first-cancellation pulse.

12. The apparatus of claim 1, where the crest factor reduction block comprises a processor configured to
identify K signal areas of the multicarrier communication signal to search for one or more true signal peaks in the block of input samples stored in the sampling block memory at an intermediate signal sampling rate L;
identify selected parameters of the one or more true signal peaks in the K signal areas by searching a peak vicinity area of signal area samples at higher signal sampling rate M, where L<M and where K, L, and M are integers; and
generate the cancellation pulse for each of the one or more true signal peaks by scaling and time-aligning a cancellation waveform based on the selected parameters of the corresponding true signal peak.

13. The apparatus of claim 12, where the processor is further configured to
generate K signal phases from the block of input samples stored in the sampling block memory to analyze the K signal phases at low signal sampling rate S<L to determine one or more power parameters, and to elect one or more of the K signal phases for output based on the one or more power parameters for each signal phase.

14. A method for generating a multicarrier communication signal having a reduced crest factor, comprising:
generating a first multicarrier communication signal from a plurality of baseband transmission signals;
storing a block of input samples from the first multicarrier communication signal in a sampling block memory;
performing non-sequential, block-based processing on the block of input samples stored in the sampling block memory to suppress one or more signal peaks in the block of input samples by generating one or more cancellation pulse waveforms by:
using a peak search window to select a first low rate signal peak from the block of input samples that exceeds a specified power threshold,
up-sampling a plurality of low rate input samples in a defined neighborhood around the first low rate signal peak to generate a plurality of up-sampled values, and
identifying a true signal peak from the plurality of up-sampled values, where the true signal peak has a specified phase and amplitude; and
applying the one or more cancellation pulse waveforms to the block of input samples stored in the sampling block memory to generate a second multicarrier communication signal having a reduced crest factor.

15. The method of claim 14, where performing non-sequential, block-based processing on the block of input samples comprises:
detecting one or more signal peaks in the block of input samples which exceed a specified power threshold, and
suppressing at least a first selected signal peak selected from the one or more signal peaks by applying a first cancellation pulse to the block of input samples stored in the sampling block memory which is phase-aligned with the first selected signal peak.

16. The method of claim 14, where the steps of performing non-sequential, block-based processing and applying the one or more cancellation pulse waveforms are iteratively applied with a plurality of passes to the block of input samples stored in the sampling block memory.

17. A method for generating a multicarrier communication signal having a reduced crest factor, comprising:
generating a first multicarrier communication signal from a plurality of baseband transmission signals;
storing a block of input samples from the first multicarrier communication signal in a sampling block memory;
performing non-sequential, block-based processing on the block of input samples stored in the sampling block memory to suppress one or more signal peaks in the block of input samples by generating one or more cancellation pulse waveforms by:
identifying K signal areas from the block of input samples stored in the sampling block memory to search for one or more true signal peaks at an intermediate signal sampling rate L;
identifying selected parameters of the one or more true signal peaks in the K signal areas by searching a peak vicinity area of signal area samples at higher signal sampling rate M, where L<M and where K, L, and M are integers; and
generating a cancellation pulse waveform for each of the one or more true signal peaks by scaling and time-aligning a cancellation waveform based on the selected parameters of the corresponding true signal peak; and applying the one or more cancellation pulse waveforms to the block of input samples stored in the sampling block memory to generate a second multicarrier communication signal having a reduced crest factor.

18. An apparatus for generating a communication signal having a reduced crest factor, comprising:
- a sampling block memory for storing a block of input samples from a multicarrier communication signal; and
- a crest factor reduction block coupled to the sampling block memory for performing block-based processing to detect one or more signal peaks in the block of input samples stored in the sampling block memory which exceed a specified power threshold, and to cancel at least a first selected signal peak selected from the one or more signal peaks by applying a first cancellation pulse to the block of input samples stored in the sampling block memory which is phase-aligned with the selected signal peak, where the crest factor reduction block is configured to use one or more predetermined cancellation criteria when cancelling at least the first selected largest signal peak to implement a minimum separation requirement between adjacent cancelled peaks by sequentially repeating application of the one or more predetermined cancellation criteria to select a plurality of cancelled peaks within the block of input signals.

19. An apparatus for generating a communication signal having a reduced crest factor, comprising:
- a sampling block memory for storing a block of input samples from a multicarrier communication signal;
- a memory device for storing cross-over samples and differential values from adjacent blocks of input samples to ensure continuity of processing between the blocks of input samples; and
- a crest factor reduction block coupled to the sampling block memory and the memory device for performing block-based processing to detect one or more signal peaks in the block of input samples stored in the sampling block memory which exceed a specified power threshold, and to cancel at least a first selected signal peak selected from the one or more signal peaks by applying a first cancellation pulse to the block of input samples stored in the sampling block memory which is phase-aligned with the selected signal peak.

20. An apparatus for generating a communication signal having a reduced crest factor, comprising:
- a sampling block memory for storing a block of input samples from a multicarrier communication signal; and
- a crest factor reduction block coupled to the sampling block memory for performing block-based processing to detect one or more signal peaks in the block of input samples stored in the sampling block memory which exceed a specified power threshold, and to cancel at least a first selected signal peak selected from the one or more signal peaks by applying a first cancellation pulse to the block of input samples stored in the sampling block memory which is phase-aligned with the selected signal peak, where the crest factor reduction block is configured to perform block-based processing by using a peak search window to select a first low rate signal peak that exceeds the specified power threshold in the block of input samples, up-sampling a plurality of low rate input samples in a defined neighborhood around the first low rate signal peak to generate a plurality of up-sampled values, and identifying a true signal peak from the plurality of up-sampled values, where the true signal peak has a specified phase and amplitude.

21. The apparatus of claim 20, where the crest factor reduction block is configured to cancel at least the first selected signal peak by using the specified phase of the true signal peak to adjust the phase of the first-cancellation pulse.

* * * * *

UNITED STATES PATENT AND TRADEMARK OFFICE
CERTIFICATE OF CORRECTION

PATENT NO. : 9,100,253 B2  
APPLICATION NO. : 13/569148  
DATED : August 4, 2015  
INVENTOR(S) : Mundarath et al.

Page 1 of 1

It is certified that error appears in the above-identified patent and that said Letters Patent is hereby corrected as shown below:

In the claims

Col. 22, line 1, Claim 13 should read mine one or more power parameters, and to select one or Signed and Sealed this  
Eighth Day of December, 2015

Michelle K. Lee  
*Director of the United States Patent and Trademark Office*